(12) United States Patent
Henon et al.

(10) Patent No.: US 10,165,237 B2
(45) Date of Patent: Dec. 25, 2018

(54) HEAD-UP DISPLAY PROJECTING VISUAL INFORMATION ONTO A SCREEN

(71) Applicant: JOHNSON CONTROLS AUTOMOTIVE ELECTRONICS SAS, Cergy Pontoise (FR)

(72) Inventors: Fabrice Henon, Cergy (FR); Yves Lambert, Osny (FR); Nicolas Louvieaux, Parnes (FR); Shenol Hasan, Sofia (BG); Dimitar Andreev, Sofia (BG)

(73) Assignee: JOHNSON CONTROLS AUTOMOTIVE ELECTRONICS SAS, Cergy Pontoise (FR)

( * ) Notice: Subject to any disclaimer, the term of this patent is extended or adjusted under 35 U.S.C. 154(b) by 16 days.

(21) Appl. No.: 15/303,018

(22) PCT Filed: Apr. 9, 2015

(86) PCT No.: PCT/EP2015/000751
§ 371 (c)(1),
(2) Date: Oct. 10, 2016

(87) PCT Pub. No.: WO2015/154879
PCT Pub. Date: Oct. 15, 2015

(65) Prior Publication Data
US 2017/0034487 A1 Feb. 2, 2017

(30) Foreign Application Priority Data
Apr. 10, 2014 (EP) .................. 14164208

(51) Int. Cl.
*H04N 9/31* (2006.01)
*G02B 27/01* (2006.01)
(Continued)

(52) U.S. Cl.
CPC .......... *H04N 9/3144* (2013.01); *B60K 35/00* (2013.01); *B60K 37/02* (2013.01);
(Continued)

(58) Field of Classification Search
CPC .. H04N 9/3144; H04N 9/315; G02B 27/0101; G02B 27/0149; B60K 35/00;
(Continued)

(56) References Cited

U.S. PATENT DOCUMENTS 7,322,704 B2 * 1/2008 Shchegrov ............. H01S 5/141
 348/E9.027
8,540,376 B2 * 9/2013 Kaneko ............. G02B 27/0972
 257/98
(Continued)

FOREIGN PATENT DOCUMENTS

JP H 0811580 A 1/1996
JP 2007086387 A 4/2007
(Continued)

*Primary Examiner* — Andrew Sasinowski
(74) *Attorney, Agent, or Firm* — Leydig, Voit & Mayer, Ltd.

(57) ABSTRACT

A head-up display far projecting visual information onto a screen includes: a projector, comprising a light source and a light modulation device for generating the visual information. The projector further includes a global radiator for cooling the projector. The projector is arranged adjacent to a kinematic device. The global radiator includes at least partially a material having a thermal conductivity greater than 100 W/(mK).

18 Claims, 1 Drawing Sheet

(51) Int. Cl.
*B60K 35/00* (2006.01)
*B60K 37/02* (2006.01)
*G03B 21/16* (2006.01)

(52) U.S. Cl.
CPC ..... *G02B 27/0101* (2013.01); *G02B 27/0149* (2013.01); *G03B 21/16* (2013.01); *H04N 9/315* (2013.01); *B60K 2350/203* (2013.01); *B60K 2350/2052* (2013.01); *B60Y 2400/92* (2013.01); *G02B 2027/0156* (2013.01)

(58) Field of Classification Search
CPC .............. B60K 37/02; B60K 2350/203; B60K 2350/2052; G03B 21/16; B60Y 2400/92
See application file for complete search history.

(56) References Cited

U.S. PATENT DOCUMENTS

| | | | | |
|---|---|---|---|---|
| 8,585,215 B2* | 11/2013 | Nakano | ................ | G03B 21/208 |
| | | | | 353/56 |
| 9,270,957 B2* | 2/2016 | Yoshida | ................ | H04N 9/3129 |
| 9,462,214 B2* | 10/2016 | Kobayashi | ......... | G02B 27/0101 |
| 2010/0066980 A1* | 3/2010 | Tsuchiya | ........... | G02F 1/133385 |
| | | | | 353/56 |

FOREIGN PATENT DOCUMENTS

| | | |
|---|---|---|
| JP | 2009169399 A | 7/2009 |
| JP | 2009288484 A | 12/2009 |

* cited by examiner

HEAD-UP DISPLAY PROJECTING VISUAL INFORMATION ONTO A SCREEN

CROSS-REFERENCE TO RELATED APPLICATIONS

This application is a U.S. National Phase application under 35 U.S.C. § 371 of International Application No. PCT/EP2015/000751, filed on Apr. 9, 2015, and claims benefit to European Patent Application No. EP 14164208.2, filed on Apr. 10, 2014. The International Application was published in English on Oct. 15, 2015 as WO 2015/154879 A1 under PCT Article 21(2).

FIELD

The present invention relates to a head-up display that projects visual information onto a screen.

BACKGROUND

Head-up displays are typically integrated into a vehicle dashboard and are intended to supply a passenger of the vehicle with information such as the current vehicle speed, the fuel gauge and/or warnings, for example. Typically, the visual information is projected onto a mirror or a combiner that is reversibly transformable between a usage position and a non-usage position.

In general, it is advantageous to realize a compact head-up display due to the limited space in front of the passenger. It is therefore reliable to arrange the components of the head-up display directly next to each other. As a consequence, the space between a kinematic device (for transforming the combiner between the usage and the non-usage position) and a liquid crystal device, such as a thin film transistor (TFT)-display, is limited. This space is, however, provided for a light source that generates the backlight for illuminating the TFT-display as it is needed for projecting the visual information generated by the TFT-display onto the screen. Consequently, heat being generated by the light source of the operating head-up display influences the TFT-display negatively and can even destroy it.

SUMMARY

In an embodiment, the present invention provides a head-up display for projecting visual information onto a screen. The head-up display includes: a projector, comprising a light source and a light modulation device for generating the visual information. The projector further includes a global radiator for cooling the projector. The projector is arranged adjacent to a kinematic device. The global radiator includes at least partially a material having a thermal conductivity greater than 100 W/(mK).

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
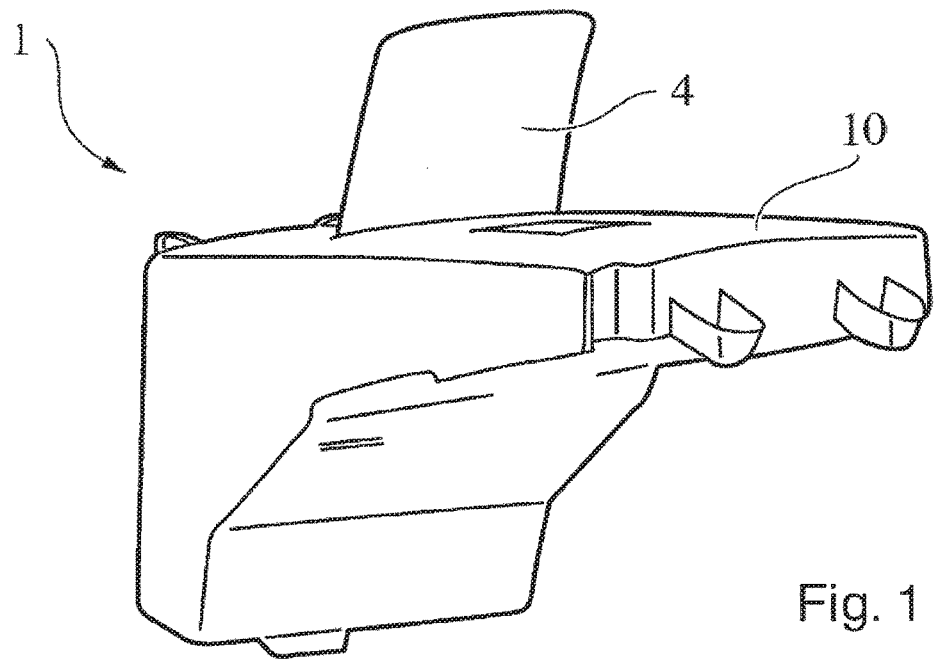
FIG. 1 shows a head-up display according to a first exemplary embodiment of the present invention in a perspective view.

In an embodiment, the present invention provides a head-up display with a projector unit, wherein the heat of the operating projector unit is reduced without giving up the positive effect of arranging a heat generating light source and a liquid crystal device, which is affected by the heat, next to each other.

In an embodiment, the present invention provides a head-up display for projecting visual information onto a screen, wherein the head-up display has a projector unit comprising a light source and a light modulation device for generating the visual information, wherein the projector unit has a global radiator for cooling the projector unit. Further it is provided that the projector unit is arranged immediately adjacent to a kinematic device and the global radiator comprises at least partially a material having a thermal conductivity greater than 100 W/(mK), preferably greater than 150 W/(mK) and more preferably greater than 200 W/(mK).

In contrast to the state of the art, it is herewith advantageously possible to reduce the heat of the projector unit by the global radiator such that a proper operating of the head-up display is possible. Thus, a potential defect that can be otherwise caused by the heat originating from the light source can be avoided. Furthermore, it is possible to use such a powerful light source as a backlight for the light modulation device, that the screen is illuminated uniformly and reaches an illumination of at least 6000 Cd/m$^2$.

Preferably, it is provided that the light modulation device generates the visual information that is projected onto the screen by illuminating the light modulating device using the backlight of the light source. In particular, the light modulating device is at least partially transparent and the light from the light source, namely the backlight, passes the light modulation device at least partially. Preferably, at least a part of the light modulating device changes its transparency and/or color whenever the visual information has to be modified. Thus, the modulating device modulates the light of the light source corresponding to the visual information. Furthermore, it is provided that the global radiator device reduces the heat of at least two components of the projector unit by contacting them respectively.

According to another embodiment of the present invention, it is provided that
the light modulation device comprises a lens and/or a liquid crystal display and/or
the light source is integrated into a printed circuit board. By using the liquid crystal display such as a TFT (thin film transistor)-display a light modulation device is provided that can generate the visual information. In particular, it is provided that the global radiator guarantees that the temperature of the TFT-display is below 95° C. and therefore a damage caused by the heat of the TFT-display may be avoided. Furthermore, it is provided that the light from the light source passes the liquid crystal display for projecting the visual information generated by the liquid crystal device onto the screen. In particular, it is possible to change the visual information rapidly by controlling the liquid crystal display. For this purpose, the liquid crystal display is preferably connected to a control unit that determinates the information that should be generated by the light modulation device. Furthermore, it is provided that the light modulation device comprises a component, such as a lens, an aperture or a lens system, that modifies the light emitted by the light source for a preferably uniform illumination of the screen. As a consequence, the quality of the projected visual information is further raised. Furthermore, it is provided that the light source is a light-emitting diode (LED) that is preferably integrated into a printed circuit board. Such a light source is small sized and easy to handle advantageously.

According to a preferred embodiment it is provided that the projecting device is at least partially framed by the global radiator. By framing the projecting device the global radiator is able to cool jointly several, in particular all, components of the projecting device that require cooling. Preferably the global radiator extends at least partially along the periphery of the projecting device. The global radiator may cover more than 15%, preferably more than 25% and more preferably more than 40% of the projecting device. In particular the projection device is almost completely framed by the global radiator.

According to another embodiment of the present invention, it is provided that the screen is a combiner and/or a mirror. In particular, the screen is designed such that the projected visual information is at least partially reflected back to the passenger or at least partially transmitted to the passenger. Using a semi-transparent screen such as a combiner has the advantage that the field of view of the passenger is not restricted significantly. According to another embodiment of the present invention, it is provided that the global radiator contacts both the light source and the light modulation component. In particular, the global radiator contacts the light source, the lens and the TFT-display in order to realize an effective cooling of these parts of the projector unit.

According to another embodiment of the present invention, it is provided that the screen is part of a windscreen and/or is reversibly transferable by a kinematic device between a usage position and a non-usage position. Thereby a space-saving head-up display is realized advantageously. In particular, the kinematic device comprises a gearing mechanism and the screen is movably connected to a housing of the head-up display. In particular, the screen is pivoted and/or shifted for transferring the screen between the usage position and the non-usage position.

According to another embodiment of the present invention, it is provided that the projector unit is arranged below the screen in the usage position. That provides a compact head-up display.

According to another embodiment of the present invention, it is provided that the head-up display has another mirror for forwarding the generated visual information from the projector unit to the screen. Thereby the projector unit can be located directly below the combiner and/or mirror.

According to another embodiment of the present invention, it is provided that the lens is arranged between the light sources and the liquid crystal display, wherein the lens is arranged inside the global radiator. In particular, it is provided that the lens, the light source and the liquid crystal display are framed by the global radiator. It is herewith possible to generate a compact and robust projector unit.

According to another embodiment of the present invention, it is provided that the global radiator has
  a ripped design and/or
  an additional fan.

Such a configuration of the global radiator advantageously increases the capability of the global radiator for cooling the projector unit at least partially. The ripped design increases the surface that can emit the heat being collected by the global radiator.

Global radiators having a high thermal conductivity are preferably effective global radiators.

According to another embodiment of the present invention, it is provided that the global radiator comprises at least partially Aluminum. Aluminum has a high thermal conductivity. A radiator having Aluminum is therefore an effective global radiator.

According to another embodiment of the present invention, it is provided that the projector unit is arranged immediately adjacent to the screen in its non-usage position. It is herewith advantageously possible to realize a head-up display that is designed such that it can be easily integrated into a vehicle. In such a case the global radiator allows using a powerful light source for a desired screen illumination without jeopardizing the liquid crystal device.

According to another embodiment of the present invention, it is provided that the head-up display is part of a vehicle dashboard. Preferably, the head-up display is arranged in front of the passenger. It is therefore advantageously possible to localize the combiner within the field of view of the passenger.

Another subject of the present invention is a vehicle dashboard having a head-up display as it is described before.

Another subject of the present invention is a vehicle having a head-up display as it is described before.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with the reference to certain drawings but the invention is not limited thereto but only by the claims. The drawings are only schematic and are non-limiting. In the drawings, the size of some elements may be exaggerated and not drawn on scale for illustrative purposes.

Where an indefinite or definite article is used when referring to a singular noun, e.g. "a", "an", "the", this includes a plural of the noun unless something else is specifically stated.

Furthermore, the terms first, second, third and the like in the description and in the claims are used to distinguish between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1 a head-up display 1 according to a first exemplary embodiment of the present invention is illustrated in a perspective view. Such a head-up display 1 is preferably integrated into a vehicle dashboard 10 and comprises a screen 4 for displaying visual information. In particular, the head-up display 1 is arranged such that a passenger of the vehicle, in particular its driver, can take notice of the visual information without changing the head position and/or viewing direction. For example, such information is related to a current vehicle speed, fuel gauge and/or other parameters specifying the state of the vehicle and is displayed on the screen. Warnings may also be displayed on the screen, too. Consequently, the head-up display is used as a kind of prompter that supplies the passenger straightforward with information.

It is provided that the visual information is projected onto a screen 4. A mirror, a combiner or a windscreen may be used as a screen 4, for instance. In particular, it is provided that the combiner is reversibly transferable between a usage position and a non-usage position. Preferably, the combiner being in the usage position is arranged in a field of view of the passenger and the combiner being in the non-usage position forms a part of the vehicle dashboard 10.

Figure 2:
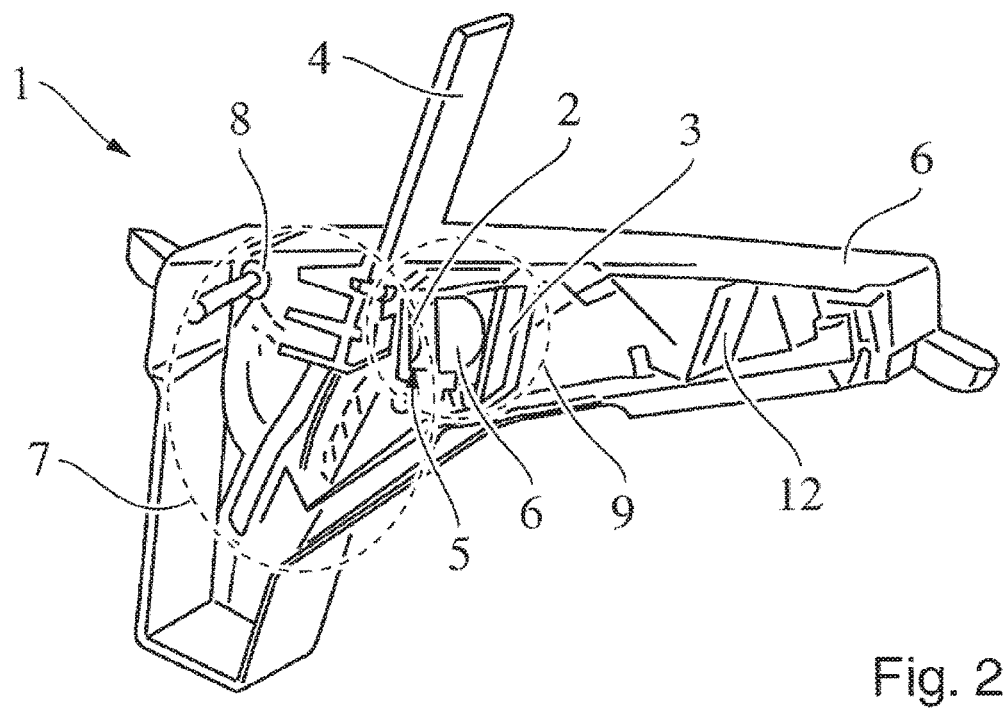
FIG. 2 shows the head-up display according to the first exemplary embodiment of the present invention in a sectional view.

In FIG. 2 a sectional view of the head-up display 1 according to the first exemplary embodiment is illustrated. Herewith, it is provided that the head-up display 1 has a projector unit 9 that generates the visual information. For generating the visual information, the projector unit 9 has a light source 2 as a backlight, such as a LED integrated in a printed circuit board, and a light modulation device for modulating the backlight such that a visual information is projected from the light modulation device to the screen 4. Preferably, the light modulation device comprises a lens 6 and/or a liquid crystal display 3, in particular a TFT (thin film transistor) display. In particular, it is provided that the liquid crystal display 3 generates the visual information that is projected onto the screen 4 by using the backlight of the light source 2. Preferably, the projector unit 9 is arranged immediately below the head-up display 1. Therefore, another mirror 12 is needed for forwarding the visual information from the projector unit 9 to the screen 4 in the usage position. Preferably, another mirror 12 is integrated in a housing or part of the dashboard that accommodates also the projector unit 9. Furthermore, it is provided that the combiner is pivotally connected to the housing and/or can be moved translationally. In particular, the combiner is pivoted and/or shifted by a kinematic device 7 between the usage position and the non-usage position, wherein the kinematic device 7 preferably comprises a gearing mechanism 8.

For adequately illuminating the screen 4 in such a head-up display 1, the backlight originating from the light source 2 has to be powerful. In an exemplary embodiment, the light source 2 is sufficiently powerful so as to realize an illumination of 6000 Cd/m$^2$ on the combiner. As a consequence, heat originating from the light source may affect the liquid crystal display 3, in particular the TFT display, disadvantageously. The compact arrangement of the combiner, the kinematic device 7, the light source 2, the lens 6 and liquid crystal display 3 enhances the impairment of the liquid crystal display 3 by the heat of the light source 2. An increment of the heat of the liquid crystal display 3 may damage it or prevent it from being operable properly. Therefore, in an exemplary embodiment, the projector unit 9 is cooled at least partially for guaranteeing a proper operating of the head-up display 1. For this purpose, it is provided that the projector unit 9 comprises a global radiator 5 for cooling the head-up display 1 without giving up the advantageous arrangement components that form the head-up display 1. In particular, it is provided that the global radiator 5 allows the light source 2, preferably the printed circuit board with the integrated LED, the lens 6 and the liquid crystal display 3, in particular the TFT-display, to be maintained and cools the liquid crystal display 3, preferably the TFT-display. In particular, the global radiator 5 has a ripped design and/or is at least partially made from a metal having a thermal conductivity greater than 100 W/(mK), preferably greater than 150 W/(mK) and more preferably greater than 200 W/(mK). Furthermore, it is provided that the global radiator 5 contacts the printed circuit board with the integrated LED, the lens 6 and the TFT-display. In particular, the lens 6 is framed by the global radiator 5. Furthermore, it is preferably provided that the printed circuit board with the integrated LED and/or the TFT-display are located at opposite regions of the global radiator 5 and are at the ends of the global radiator. As a consequence, the global radiator 5 provides a compact projector unit 9 having components that are rigidly fixed to each other in well-defined distances by the framing global radiator 5.

Furthermore, it is provided that such a TFT-display is tilted with respect to a direction being perpendicular to a main propagation direction of the backlight in order to compensate aberrations on the screen 4. Preferably, the global radiator 5 is adapted to the tilted TFT-display and is designed asymmetrically.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS 1 head-up display
2 light source
3 liquid crystal display
4 screen
5 global radiator
6 lens
7 kinematic device
8 gearing mechanism
9 projector unit
10 housing/dashboard
12 another mirror

The invention claimed is:
1. A head-up display for projecting visual information onto a screen, wherein the head-up display comprises:
a projector, comprising a light source and a light modulation device for generating the visual information, wherein the light modulation device comprises a lens and a liquid crystal display, wherein the lens is arranged between the light source and the liquid crystal display;

wherein the projector further comprises a global radiator for cooling the projector, wherein the global radiator contacts both the light source and the light modulation device;

wherein the projector is arranged adjacent to a kinematic device; and wherein the global radiator comprises at least partially a material having a thermal conductivity greater than 100 W/(mK).

2. The head-up display according to claim 1, wherein the screen is a combiner and/or a mirror.

3. The head-up display according to claim 2, wherein the head-up display has a second mirror for forwarding the generated visual information from the projector to the screen.

4. The head-up display according to claim 1, wherein the screen is part of a windscreen and/or is reversibly transferable by the kinematic device between a usage position and a non-usage position.

5. The head-up display according to claim 1, wherein the projector is arranged below the screen in a usage position of the screen.

6. The head-up display according claim 1, wherein the lens is arranged inside the global radiator.

7. The head-up display according to claim 1, wherein the global radiator has a ripped design.

8. The head-up display according to claim 1, wherein the global radiator comprises aluminum.

9. The head-up display according to claim 1, wherein the projector is arranged adjacent to the screen in a non-usage position of the screen.

10. The head-up display according to claim 1, wherein the head-up display is part of a vehicle dashboard.

11. The head-up display according to claim 1, wherein the global radiator has a fan for cooling the projector.

12. The head-up display according to claim 1, wherein the light source is configured to provide uniform illumination of the screen of at least 6000 Cd/m$^2$.

13. The head-up display according to claim 1, wherein the projector is at least partially framed by the global radiator, wherein the global radiator extends at least partially along the periphery of the projector.

14. The head-up display according to claim 1, wherein the light source and the liquid crystal display are located at opposite ends of the global radiator.

15. The head-up display according to claim 1, wherein the liquid crystal display is tilted relative to a direction being perpendicular to a main propagation direction of the light from the light source in order to compensate for aberrations in the screen.

16. A vehicle dashboard, comprising:
a head-up display for projecting visual information onto a screen, wherein the head-up display comprises:
a projector, comprising a light source and a light modulation device for generating the visual information, wherein the light modulation device comprises a lens and a liquid crystal display;
wherein the projector further comprises a global radiator for cooling the projector, wherein the lens is arranged inside the global radiator;
wherein the projector is arranged adjacent to a kinematic device; and
wherein the global radiator comprises at least partially a material having a thermal conductivity greater than 100 W/(mK).

17. A vehicle, comprising:
a head-up display for projecting visual information onto a screen, wherein the head-up display comprises:
a projector, comprising a light source and a light modulation device for generating the visual information, wherein the light modulation device comprises a lens and a liquid crystal display, wherein the lens is arranged between the light source and the liquid crystal display;
wherein the projector further comprises a global radiator for cooling the projector, wherein the global radiator contacts both the light source and the light modulation device, and wherein the lens is arranged inside the global radiator;
wherein the projector is arranged adjacent to a kinematic device; and
wherein the global radiator comprises at least partially a material having a thermal conductivity greater than 100 W/(mK).

18. The head-up display according to claim 1, wherein the light source is integrated into a printed circuit board.

* * * * *